US 8,003,927 B2

(12) United States Patent
Kondo et al.

(10) Patent No.: US 8,003,927 B2
(45) Date of Patent: Aug. 23, 2011

(54) IMAGE PROJECTION APPARATUS WHICH PROJECTS AN IMAGE CORRECTED ACCORDING TO A PROJECTION SURFACE

(75) Inventors: Satoshi Kondo, Kyoto (JP); Takahiro Nishi, Nara (JP); Tadamasa Toma, Osaka (JP); Toshiyasu Sugio, Osaka (JP)

(73) Assignee: Panasonic Corporation, Osaka (JP)

( * ) Notice: Subject to any disclaimer, the term of this patent is extended or adjusted under 35 U.S.C. 154(b) by 546 days.

(21) Appl. No.: 12/097,717

(22) PCT Filed: Dec. 8, 2006

(86) PCT No.: PCT/JP2006/324517
§ 371 (c)(1),
(2), (4) Date: Aug. 5, 2008

(87) PCT Pub. No.: WO2007/072695
PCT Pub. Date: Jun. 28, 2007

(65) Prior Publication Data
US 2009/0310100 A1 Dec. 17, 2009

(30) Foreign Application Priority Data
Dec. 22, 2005 (JP) .................................. 2005-370917

(51) Int. Cl.
*H01L 27/00* (2006.01)
(52) U.S. Cl. ................................. 250/208.1; 250/214 R
(58) Field of Classification Search ............... 250/208.1, 250/214 R; 353/69, 79, 121, 122; 382/254–275; 348/745–747; 345/419–428
See application file for complete search history.

(56) References Cited

U.S. PATENT DOCUMENTS

| 6,416,186 | B1 | 7/2002 | Nakamura |
| 6,932,480 | B2 | 8/2005 | Wada et al. |
| 7,184,054 | B2 * | 2/2007 | Clark ............................. 345/589 |
| 7,262,816 | B2 * | 8/2007 | McDowall et al. ........... 348/745 |
| 2005/0018144 | A1 | 1/2005 | Wada et al. |
| 2005/0024597 | A1 | 2/2005 | Kubo et al. |

FOREIGN PATENT DOCUMENTS

| CN | 1577048 | 2/2005 |
| EP | 1 492 337 | 12/2004 |
| JP | 2001-61121 | 3/2001 |
| JP | 2002-71315 | 3/2002 |
| JP | 2004-29110 | 1/2004 |
| JP | 2005-39784 | 2/2005 |

OTHER PUBLICATIONS

International Search Report issued in the International (PCT) Application of which the present application is the U.S. National Stage.
Oliver Bimber et al. "*Embedded Entertainment with Smart Projectors*", IEEE Computer Society, Jan. 2005, pp. 48-55.

* cited by examiner

*Primary Examiner* — Que T Le
(74) *Attorney, Agent, or Firm* — Wenderoth, Lind & Ponack, L.L.P.

(57) ABSTRACT

An image projection apparatus of the present invention projects a corrected image according to a projection surface, and includes: an imaging unit for capturing a projected image; a correction parameter calculation unit for calculating a correction parameter, on the basis of the captured image, for correcting an image distortion caused by the projection surface; a correction unit for generating a corrected image by correcting the image using the correction parameter; a reproduction level calculation unit for calculating a reproduction level of the corrected image relative to the original image; an image generation unit for generating a guidance image regarding the reproduction level; and a control unit for controlling projection of the guidance image.

21 Claims, 17 Drawing Sheets

(a) 
The reproduction level is 90%.
Is it all right to project
the image here? — D1

(b)

(c)
Images cannot be beautifully
reproduced here.
Please change to another area. — D6

| Map table | | |
|---|---|---|
| (x, y) | (x', y') | (R, G, B) |
| (1, 1) | (6.7, 2.3) | (55, 21, 13) |
| ⋮ | ⋮ | |
| (400, 300) | (325.8, 265.1) | (130, 21, 87) |
| ⋮ | ⋮ | |

IMAGE PROJECTION APPARATUS WHICH PROJECTS AN IMAGE CORRECTED ACCORDING TO A PROJECTION SURFACE

TECHNICAL FIELD

The present invention relates to an image projection apparatus which projects an image corrected according to at least one of a shape and a color of a projection surface.

BACKGROUND ART

As a conventional image projection apparatus (projector apparatus), references including Patent Document 1 disclose a projector apparatus which performs distortion correction on an image according to a shape of a projection surface and also performs distortion correction on an image displayed on a projection surface having an irregular surface or a curved surface.

Moreover, references including Non-patent Document 1 disclose a projector apparatus which corrects an image according to a color and a shape of a projection surface and projects the corrected image, thereby obtaining a projection result which is closer to the original image. This projector apparatus enables not only a white screen, but also an arbitrary place in a room, such as a printed curtain, a wall having different colors, or a wall corner, to be used as a projection surface.

Patent Document 1: Japanese Unexamined Patent Publication No. 2001-61121

Patent Document 2: Japanese Unexamined Patent Publication No. 2002-71315

Non-patent Document 1: "Embedded Entertainment with Smart Projectors" by Oliver Bimber, Andreas Emmerling, Thomas Klemmer (IEEE Computer January, 2005, pp 48-55)

SUMMARY OF THE INVENTION

Problems that Invention is to Solve

The conventional image projection apparatus corrects an image according to the color and the shape of the projection surface, thereby projecting an image close to the original image. However, since there is no way for a user to know how close the obtained image is to the original image, the user is not sure what to do in order to obtain an image even closer to the original image. For example, it is difficult for the user to know which one of the following is the case for obtaining an image closest to the original image: a case where the image is projected on a printed wall; a case where the image is projected on a printed curtain; and a case where the image is projected across a printed wall and a printed curtain. For this reason, it is difficult to use a corrected image which is closer to the original image with certainty.

An object of the present invention is to provide an image projection apparatus and a method thereof which make it easy for the user to use an image closer to the original image.

Means to Solve the Problems

To solve the stated problem, an image projection apparatus of the present invention includes: an imaging unit which captures a projected image; a calculation unit which calculates a reproduction level of the captured image relative to an original image; and a control unit which controls image projection on the basis of the reproduction level.

With this configuration, the image projection is controlled on the basis of the reproduction level of the captured image relative to the original image. This makes it easy to use an image closer to the original image. In other words, this makes it easy to use a projection area in which the reproduction level is high.

Also, an image projection apparatus of the present invention includes: an imaging unit which captures a projected image; a first calculation unit which calculates a correction parameter, on the basis of the captured image, for correcting an image distortion caused by the projection surface; a correction unit which generates a corrected image by correcting the image using the correction parameter; a second calculation unit which calculates a reproduction level of one of the corrected image generated by the correction unit and the corrected image obtained through the projection and the image capture, relative to an original image; and a control unit which controls image projection according to the reproduction level.

With this configuration, the image projection is controlled on the basis of the reproduction level of the captured corrected-image relative to the original image. This makes it easy to use an image closer to the original image. In other words, this makes it easy to use a projection area in which the reproduction level is high.

Here, the image projection apparatus may include an image generation unit which generates a guidance image regarding the reproduction level, wherein the control unit may control projection of the guidance image.

With this configuration, the user obtains the information regarding the reproduction level from the guidance image, thereby using the corrected image closer to the original image.

Here, the image generation unit may judge, according to the reproduction level, whether or not the projection onto a projection surface is appropriate, and generate the guidance image showing a result of the judgment.

With this configuration, the user can know as to whether the projection is appropriate or inappropriate from the guidance image, thereby reliably using the corrected image closer to the original image.

Here, the image generation unit may select a threshold value depending on a purpose when making the appropriateness judgment, and use the selected threshold value.

With this configuration, the appropriateness of the projection can be judged properly on the basis of a purpose.

Here, the second calculation unit may calculate the reproduction level for each of a plurality of partial areas included in a projection area of the projection surface, and the image generation unit may judge, for each of the partial areas, whether or not the projection is appropriate according to the reproduction level, and generate the guidance image showing a result of the judgment for each of the partial areas.

With this configuration, the user can know the appropriateness of the projection for each partial area.

Here, the second calculation unit may calculate the reproduction level for each of a plurality of partial areas included in a projection area of the projection surface, and the image generation unit may generate the guidance image regarding the reproduction level for each of the partial areas.

With this configuration, the user can know the information regarding the reproduction level for each partial area.

Here, the control unit may perform control to cause the image to be corrected and projected when the reproduction level is larger than a predetermined value.

With this configuration, the projection can be carried out only when the reproduction level is larger than a threshold, that is, only when the reproduction level is favorable.

Here, the second calculation unit may calculate the reproduction level by comparing corresponding pixels between the corrected image and the original image.

With this configuration, the reproduction level is calculated for an image obtained by capturing a projected corrected-image. Thus, the reproduction level including both the color reproduction level and the shape reproduction level can be obtained. On account of this, it is effective in the case where the shape of the projection surface is extremely complicated or where the projection surface is a wall corner.

Here, the control unit may cause the imaging unit to capture the corrected image projected on the projection surface, and the second calculation unit may calculate the reproduction level by comparing corresponding pixels between: the image obtained by the imaging unit by capturing the corrected image; and the original image.

With this configuration, as compared with the case of capturing the projected corrected-image, a period of time taken to complete the calculation of the reproduction level can be reduced. Moreover, the reproduction level of an inverse-transformed corrected image mainly represents the color reproducibility, and this is fully practical unless the shape of the projection surface is exceptionally complicated.

Here, the image projection apparatus may further include a changing unit which changes a projection direction, wherein the control unit may decide on a plurality of projection directions for obtaining a widened area, the widened area may include a plurality of projection areas corresponding to the plurality of projection directions, the second calculation unit may calculate the reproduction level for each of the plurality of projection areas, and calculate the reproduction level of the widened area according to the reproduction level for each of the plurality of projection areas.

With this configuration, the reproduction level can be obtained relative to the widened area larger than the projection area. Therefore, a partial area in which the reproduction level is high can be searched for with a higher degree of reliability.

Here, the control unit may further select a partial area on the basis of a user operation, and cause the image to be projected onto the selected partial area.

This configuration can encourage the user to select a projection area having the highest reproduction level.

Since a control method, a semiconductor device, and a program of the present invention have the same configurations as described above, the explanations for these are omitted.

Effects of the Invention

The image projection apparatus of the present invention can make it easy to use the corrected image which is closer to the original image. In other words, the image projection apparatus makes it easy to use a projection area in which the reproduction level is high.

BRIEF DESCRIPTION OF DRAWINGS

FIG. 13 is a diagram showing an example of a map table.

Figure 1:
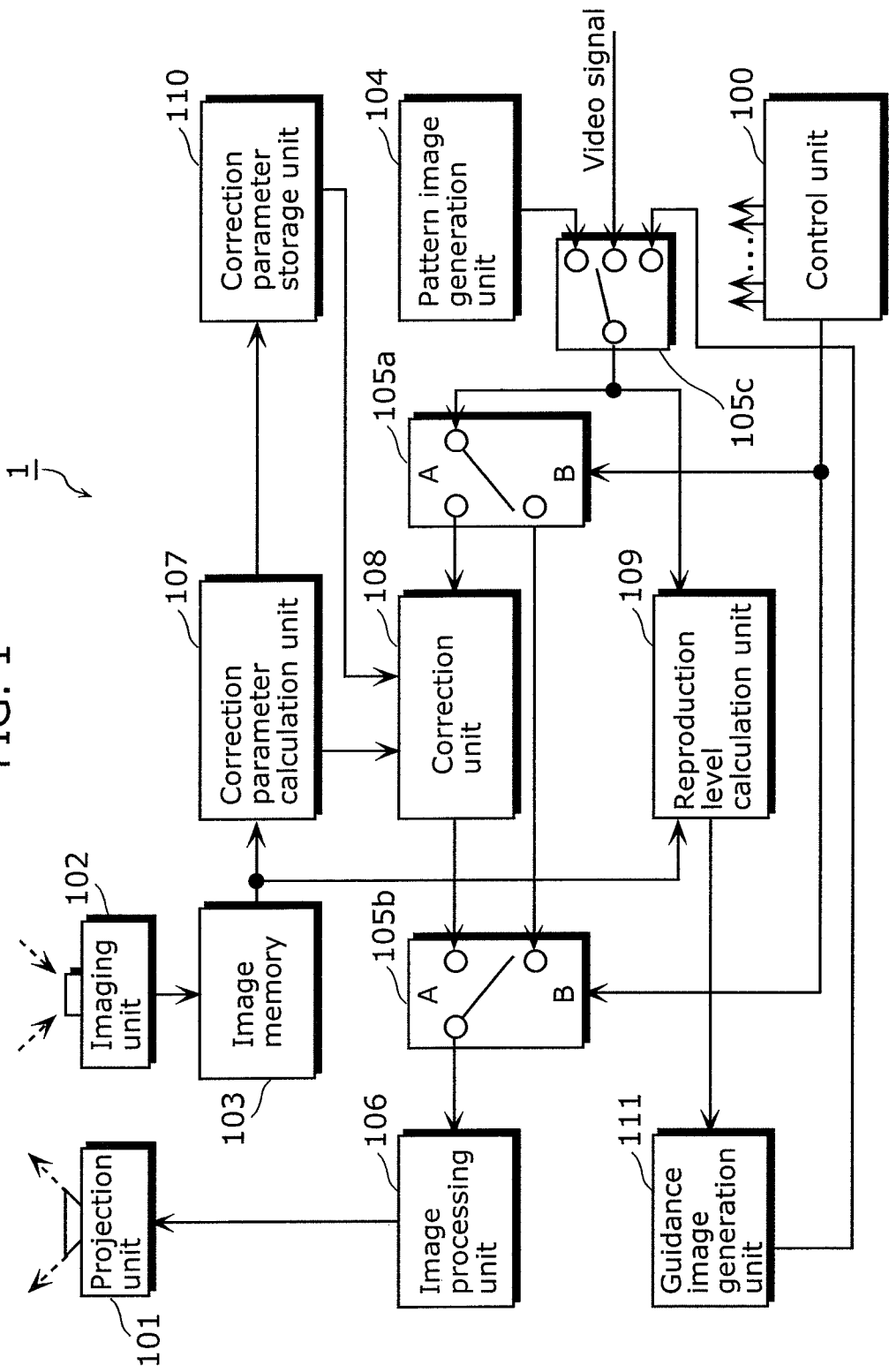
FIG. 1 is a block diagram showing a configuration of an image projection apparatus according to a first embodiment of the present invention.

NUMERICAL REFERENCES 1, 2 image projection apparatuses
100, 200 control unit
101 projection unit
102 imaging unit
103 image memory
104 pattern image generation unit
105a to 105c switches
106 image processing unit
107 correction parameter calculation unit
108 correction unit
109 reproduction level calculation unit
110 correction parameter storage unit
111 guidance image generation unit
201 oscillation mechanism

DETAILED DESCRIPTION OF THE INVENTION

First Embodiment

FIG. 1 is a block diagram showing a configuration of an image projection apparatus according to the first embodiment of the present invention. An image projection apparatus 1 of this diagram is an image projection apparatus which projects an image corrected according to a shape and a color of a projection surface, and which includes a control unit 100, a projection unit 101, an imaging unit 102, an image memory 103, a pattern image generation unit 104, switches 105a, 105b, and 105c, an image processing unit 106, a correction parameter calculation unit 107, a correction unit 108, a reproduction level calculation unit 109, a correction parameter storage unit 110, and a guidance image generation unit 111. On the basis of the reproduction level calculated by the reproduction level calculation unit 109, the image projection apparatus 1 controls image projection.

The control unit 100 controls the overall image projection apparatus 1, and controls processing including the following: (a) processing for obtaining correction parameters used for correcting an image according to the shape and the color of the projection surface; (b) correction processing for generating a corrected image using the correction parameters; (c) processing for obtaining a reproduction level of the corrected image relative to the original image; and (d) processing for generating and projecting a guidance image regarding the reproduction level. The present invention mainly relates to the above-stated (c) and (d). The above-stated (a) and (b) may be performed in the same way as in the conventional technology or may be performed as described later.

Here, the original image refers to an image which is not corrected, that is, an image which is not inputted to the correction unit 108, such as: a pattern image inputted from the switch 105c and outputted from the pattern image generation unit 104; an image included in a video signal from an external source; and a guidance image outputted from the guidance image generation unit 111. The corrected image refers to an image which has been corrected to reduce an image distortion (shape distortion and color distortion) caused by the shape and the color of the projection surface. Also, the reproduction level refers to a matching degree of the projected corrected-image relative to the original image. That is to say, the reproduction level indicates how close the projected corrected-image is reproduced relative to the original image. For example, the reproduction level is expressed as a percentage, and is expressed as 100% when the original image and the corrected image completely match with each other.

The projection unit 101 has a projector which is of translucent liquid crystal type, reflective micro-mirror type, or the like, and projects an image inputted from the image processing unit 106. In addition to a video signal inputted from an external source, the present embodiment includes a test pattern image generated by the pattern image generation unit 104 and used in the above-stated (a), a corrected test pattern image outputted from the correction unit 108 and used in the above-stated (c), and a guidance image generated by the guidance image generation unit 111 and used in the above-stated (d).

Figure 2:
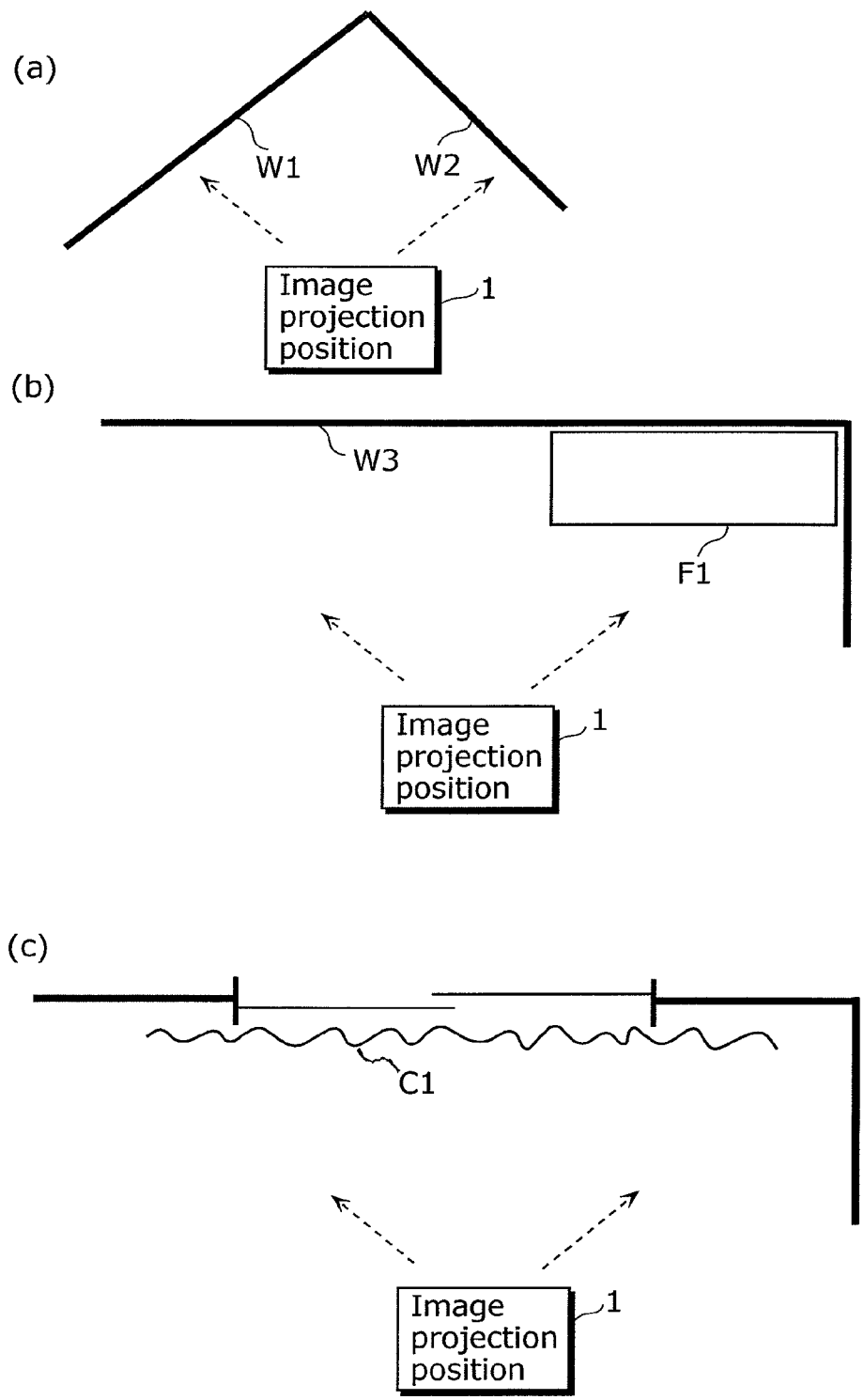
FIGS. 2(a) to (c) are diagrams for explaining examples of objects onto which the projection is to be performed.

FIGS. 2(a) to (c) are diagrams showing examples of projection surfaces which are objects onto which projection is to be performed by the projection unit 101. FIG. 2(a) shows a case where the projection is performed onto a corner of sidewalls W1 and W2 of a room. In this case, although a distortion (shape distortion) occurs to a projection area across the corner of the sidewalls W1 and W2, this shape distortion can be corrected by the correction unit 108. FIG. 2(b) shows a case where the projection is performed on a sidewall W3 and furniture F1 of a room. A shape distortion occurs to a corner formed by the sidewall W3 and the furniture F1, and a color distortion is caused due to a difference in color tone between the sidewall W3 and the furniture F1 and to a pattern of the sidewall W3 and a pattern of the furniture F1. However, these distortions can be corrected by the correction unit 108. FIG. 2(c) shows a case where the projection is performed on a curtain C1 of a room. Shape and color distortions are caused respectively due to a shape and a pattern of the curtain C1. These distortions can also be corrected by the correction unit 108.

The imaging unit 102 is a camera having a MOS or a CCD solid-state image pickup device, and captures the image projected by the projection unit 101. An imaging range of the imaging unit 102 is set so as to sufficiently include the projection area of the projection unit 101 within a usual range of use of the image projection apparatus 1.

The image memory 103 is a memory for holding the image captured by the imaging unit 102.

The pattern image generation unit 104 generates a plurality of kinds of test pattern images to be used in the above stated (a) and (c).

The switches 105a and 105b are controlled by the control unit 100. When both A terminals are connected, the original image generated by the pattern image generation unit 104 is outputted to the image processing unit 106 via the correction unit 108. When both B terminals are connected, the original image is outputted the way it is to the image processing unit 106.

The switch 105c selects a source of the original image. To be more specific, under the control of the control unit 100, the switch 105c selects the pattern image outputted from the pattern image generation unit 104 in the above stated (a) and (c), selects the guidance image outputted from the guidance image generation unit 111 in the above stated (d), and selects the video signal inputted from the external source after the ends of the above stated (a) to (d).

The image processing unit 106 performs processing for transforming the image inputted from the switch 105b into a format suitable for the projection unit 101, and then outputs the transformed image signal to the projection unit 101. The transformation processing includes image resolution transformation and signal transformation between YUV and RGB, for example.

The correction parameter calculation unit 107 calculates correction parameters in the above stated (a). The correction parameters are expressed as coordinate parameters and color correction parameters for each set of coordinates of the original image (image inputted from the switch 105a to the correction unit 108). For example, when the coordinates of the original image is (x, y) and the coordinates of the corrected image is (x', y'), the coordinate correction parameters are expressed as (x, y) and (x', y'). The color correction parameters are expressed as minuends of R, G, and B relative to pixel values of the original image.

The correction unit 108 corrects the original image using the correction parameters and then outputs the corrected image to the image processing unit 106 via the switch 105b.

FIGS. 3(a) to (d) are explanatory diagrams for explaining the correction performed by the correction unit 108. An image T1 of FIG. 3(a) shows one of the test pattern images, and is an image of a mesh here. An image T2 of FIG. 3(b) shows an image which the imaging unit 102 captures by taking an image, without correcting the image T1, that is projected slightly upward on the corner of the room by the projection unit 101 as shown in FIG. 2(a). A large shape distortion occurs mainly to part of the projected image that corresponds to the corner. An image T3 of FIG. 3(c) shows that the projection area has been decided on. A blank area in this diagram is a largest rectangular area inscribed in the projected image of the image T2, and its aspect ratio is set so as to be equal to an aspect ratio of the image T1. An image T4 of FIG. 3(d) shows a corrected image that should be obtained relative to the image T1. This image T4 is generated by performing, relative to the image T1: (i) an inverse transformation T12 from the image T1 to the image T2 (that is, a transformation T21 from the image T2 to the image T1); and (ii) scaling to fit within the rectangular area of the image T3. By obtaining a coordinate transformation that realizes (i) and (ii) for each grid (each intersection point of the mesh), the shape correction parameters (x, y) and (x', y') can be obtained.

The reproduction level calculation unit 109 calculates the reproduction level of the captured corrected-image by comparing corresponding pixels between the corrected image captured by the projection unit 101 and the original image. For example, the reproduction level is calculated as a ratio of pixels, out of all the pixels in the captured corrected-image, which match the corresponding pixels of the original image. That is, the reproduction level is calculated as a degree of matching. Note that, however, the matching in this case may mean that a difference between a pixel of the captured corrected-image and the corresponding pixel of the original image is smaller than a predetermined value. This predetermined value indicates a range within which a difference is allowed as an error. Moreover, the reproduction level calculation unit 109 calculates not only the reproduction level of the whole captured corrected-image, but also the reproduction level for each of a plurality of partial areas included in the projection area of the projection surface. On account of this, when the reproduction level is unfavorable in the whole projection area, the reduced image may be projected onto a partial area which is favorable in terms of the reproduction level. As a result, the projected image closer to the original image can be obtained.

The correction parameter storage unit 110 stores the correction parameters calculated by the correction parameter calculation unit 107. When an installation site of the image projection apparatus 1 is fixed, the correction parameter calculation unit 107 calculates the correction parameters at an initial startup. Then, from the next startup onward, the correction parameters stored in the correction parameter storage unit 110 can be repeatedly applied. When the projection surface is likely to vary in shape, such as a curtain, the correction parameters stored in the correction parameter storage unit 110 can be used as initial values of the correction parameters for the next startup onward. Accordingly, a time taken to calculate the correction parameters can be reduced.

The guidance image generation unit 111 generates a guidance image regarding the reproduction level outputted from the reproduction level calculation unit 109. In doing so, the guidance image generation unit 111 makes judgments as to: the appropriateness of the projection according to the reproduction level of the whole image; and the appropriateness of the projection for each partial area according to the reproduction level of each partial area. Then, the guidance image generation unit 111 generates guidance images showing these judgment results.

Figure 4:
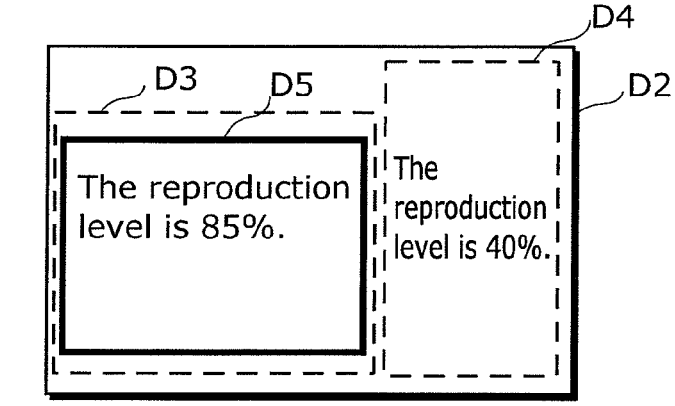
FIGS. 4(a) to (d) are diagrams for explaining examples of guidance images regarding reproduction levels.
Figure 4:
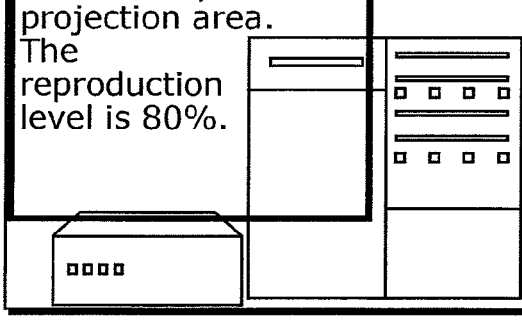

FIGS. 4(*a*) to (*d*) are diagrams for explaining examples of the guidance images.

A guidance image D1 of FIG. 4(*a*) includes a message saying "The reproduction level is 90%. Is it all right to project the image here?" This is an example of the guidance image in the case where the reproduction level of the whole captured corrected-image is favorable. This guidance image displays the reproduction level as well as the message encouraging the projection in the current state.

A guidance image D2 of FIG. 4(*b*) includes: frames (broken line frames in the diagram) indicating a partial area D3 and a partial area D4; a message saying "The reproduction level is 85%" in the partial area D3; a message saying "The reproduction level is 40%" in the partial area D4; and a recommended projection frame D5 (a thick line frame in the diagram) in the partial area D3. This is an example of the guidance image in the case where, although the reproduction level of the whole captured corrected-image is unfavorable, a partial area in which the reproduction level is favorable is present. The guidance image encourages display on the recommended projection frame D5.

A guidance image D6 of FIG. 4(*c*) includes a message saying "Images cannot be beautifully reproduced here. Please change to another area." This is an example of the guidance image in the case where the reproduction level of the whole captured corrected-image is unfavorable and no favorable partial area is present. The message encouraging a change to a favorable projection area is displayed.

A guidance image D7 of FIG. 4(*d*) includes a recommended projection frame D8 and a message in the recommended projection frame D8 that says "This is the previous projection area. The reproduction level is 80%". This guidance image D7 is projected after or alternating with the guidance image D6 of FIG. 4(*c*), for example, and is obtained by arranging a past guidance image stored in a storage unit inside the guidance image generation unit 111. In this way, the message strongly encouraging a change to a more favorable projection area is displayed. Moreover, when a guidance image showing a favorable projection area (the guidance image D1 or D2, for example) is being projected, the above-mentioned storage unit stores the present guidance image captured by the imaging unit 102 together with a background image (an image of the projection surface or an image of the projection surface and its peripheral part). Then, when the reproduction level is unfavorable in the current projection area as shown in FIG. 4(*c*), the guidance image generation unit 111 generates a guidance image encouraging a change, by arranging the past guidance image and its background image stored in the storage unit.

Figure 5A:
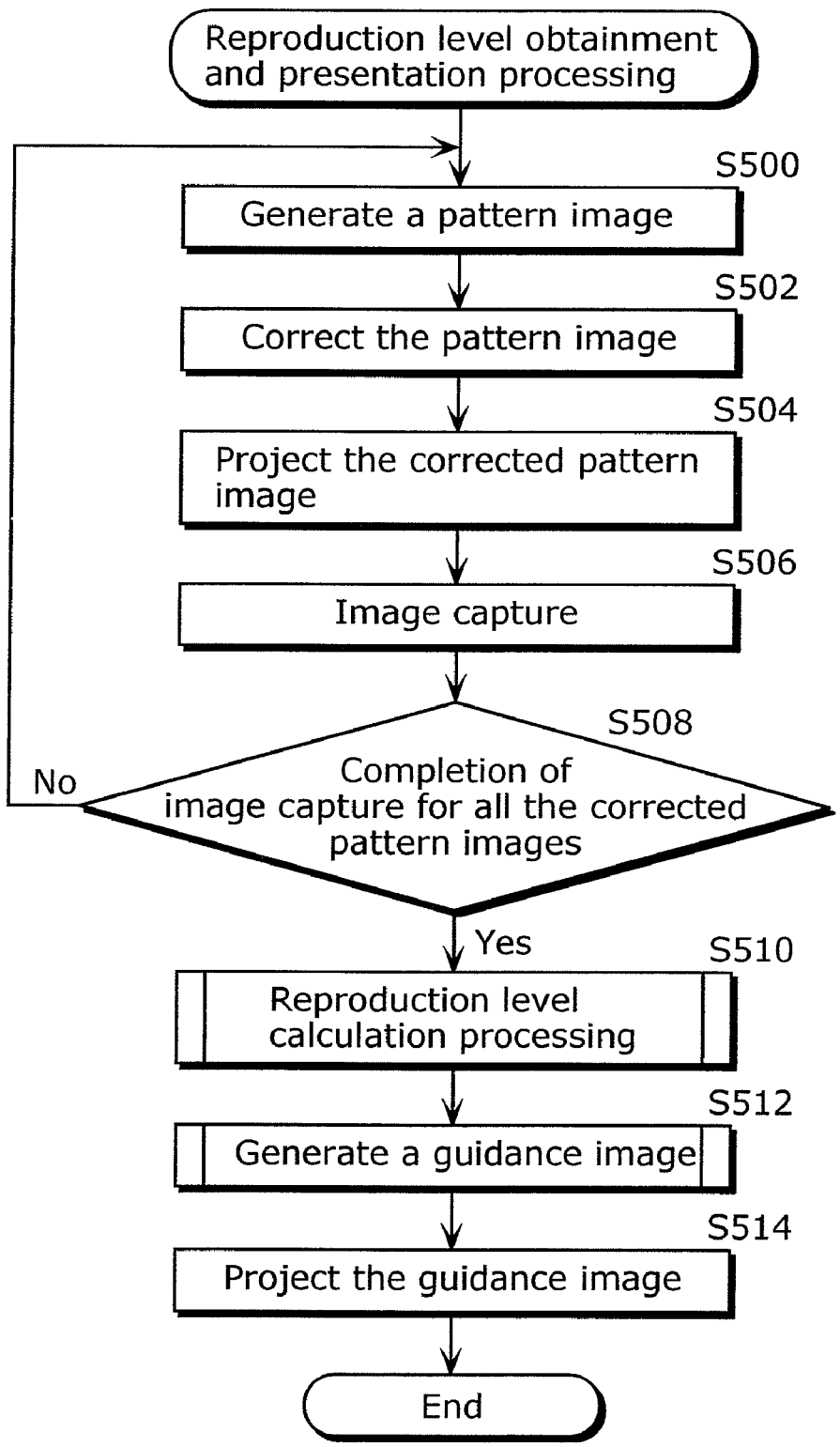
FIG. 5A is a flowchart showing processing of reproduction level obtainment and presentation.

FIG. 5A is a flowchart showing processing of reproduction level obtainment and presentation performed under the control of the control unit 100. In this diagram, the first part (up to S510) shows processing of calculating the reproduction level of the captured corrected-image relative to the original image whereas the latter part (from S512 onward) shows processing of controlling the image projection on the basis of the reproduction level. The processing in this diagram is executed after the correction parameters are obtained.

First, the control unit 100 causes: the pattern image generation unit 104 to generate one test pattern image (abbreviated as "the pattern image" hereafter) (S500); the switch 105*c* to select the pattern image; each A terminal of the switches 105*a* and 105*b* to be connected; and the correction unit 108 to correct the present pattern image (S502). After the corrected pattern image (abbreviated as "the corrected image" hereafter) is transformed by the image processing unit 106 into a format suitable for the projection unit 101, the control unit 100 causes: the projection unit 101 to project the transformed corrected-image onto the projection surface (S504); the imaging unit 102 to capture the projection surface (S506); and the image memory 103 to store the captured corrected-image. Moreover, the control unit 100 causes the stated S500 to S506 to be repeated for each of a plurality of kinds of pattern images generated by the pattern image generation unit 104.

The plurality of pattern images used here may be natural images regardless of kinds, and preferably have different distributions of edges and colors. Also, the pattern image generation unit 104 may generate, for each field, a plurality of images included in the field. For example, there may be: a plurality of images corresponding to scenes often appearing in baseball broadcasts; a plurality of images corresponding to scenes and characters often appearing in movies; a plurality of images corresponding to scenes often appearing in tennis broadcasts; a plurality of images corresponding to scenes in animations; a plurality of images corresponding to scenes of TV dramas; and a plurality of images, such as windows and menus, displayed on a screen of a personal computer. With this, a different reproduction level can be shown for each field. Note that, in the present embodiment, the test pattern images used in the correction parameter obtainment processing are also used in the processing of reproduction level obtainment and presentation. It should be noted here that the number of pattern images does not have to be more than one, and may be one.

After the completion of image capture for all the pattern images, the control unit 100 causes: the reproduction level calculation unit 109 to execute reproduction level calculation processing (S510); and the guidance image generation unit 111 to execute guidance image generation processing (S512), and then controls the projection of the guidance image (S514).

It should be noted that the processing from S500 to S506 is not necessarily performed for all the corrected pattern images. For example, the processing can be performed only for the representative corrected pattern images. Although the accuracy of the reproduction level is decreased in this case, a time taken for the image capture can be reduced.

Figure 5B:
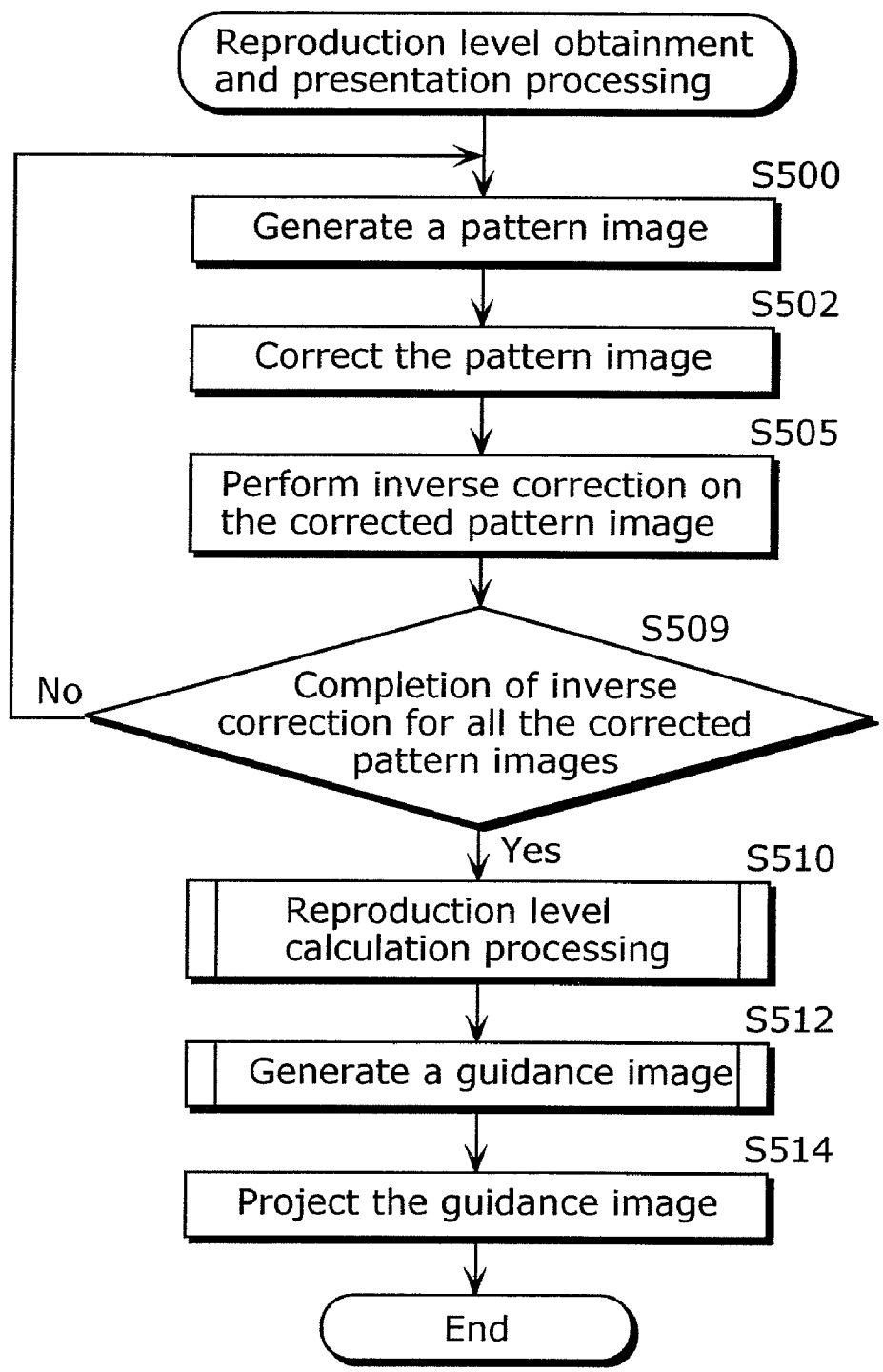
FIG. 5B is a flowchart showing another example of the processing of reproduction level obtainment and presentation.

Moreover, instead of the processing for projecting (S504) and capturing (S506) the corrected pattern image, there is a method of simulating this processing in the image projection apparatus. A flowchart in this case is shown in FIG. 5B. In FIG. 5B, instead of S504 and S506, processing of S505 is performed. In S505, inverse correction is performed on the corrected image generated in S504. Here, the inverse correction refers to the change from the image of FIG. 3($a$) to that of FIG. 3($b$), for example, and corresponds to the inverse transformation performed on the correction parameters obtained by the correction parameter calculation unit 107. The parameters for the inverse transformation are obtained by the correction parameter calculation unit 107; the inverse correction is performed by the image processing unit 106; and the inverse-corrected pattern image is stored in the image memory 103. Accordingly, a time taken for the image capture that is necessary to calculate the reproduction level can be reduced. Note that the stated inverse transformation (S505) may be performed by the correction unit 108 in place of the image processing unit 106. In this case, the correction unit 108 may once store the corrected image into the image memory 103, then read the corrected image from the image memory 103, perform the inverse correction on the read corrected image using inverse correction parameters, and store the inverse-corrected image into the image memory 103.

Figure 6:
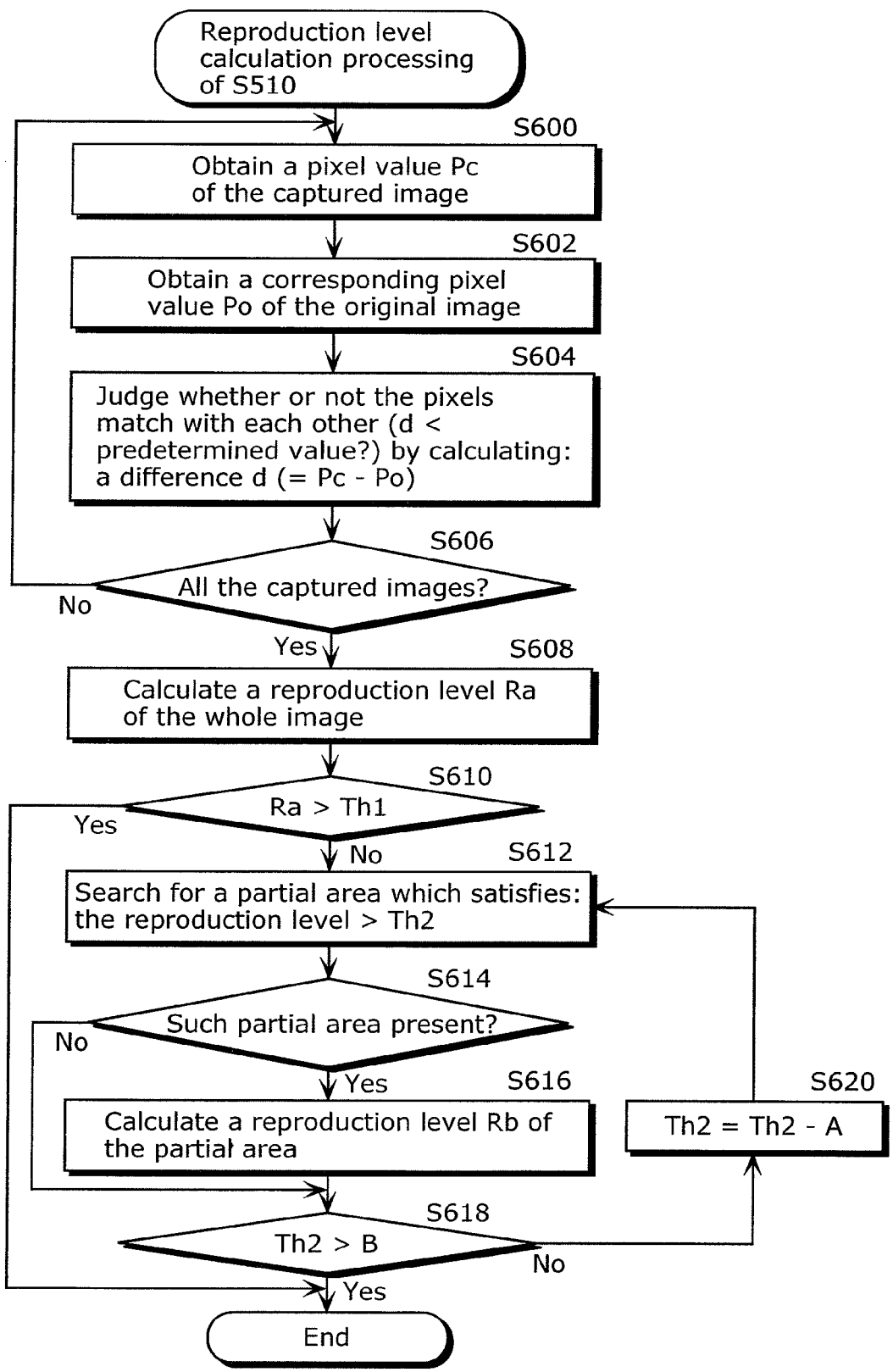
FIG. 6 is a flowchart showing details of reproduction level calculation processing.

FIG. 6 is a flowchart showing details of the reproduction level calculation processing of S510 in FIG. 5A. In this diagram, the first part (up to S606) shows processing of making matching judgments by comparing all pixels in all the captured images (images obtained by the imaging unit 102 by capturing the projected corrected pattern images) with the corresponding pixels of the original image on a pixel-by-pixel basis, whereas the latter part (from S608 onward) shows processing of calculating the reproduction levels.

First, the reproduction level calculation unit 109 obtains a pixel value Pc of the captured image which is a processing object (S600), obtains a corresponding pixel value Po of the original image (S602), and judges whether or not the pixel value Pc and the pixel value Po match with each other (S604). As described earlier, this matching judgment is made as to whether a difference d (=Pc−Po) is smaller than the predetermined value. This predetermined value indicates a range within which a difference is allowed as an error. In S600 to S604, the reproduction level calculation unit 109 performs the matching judgment for all the pixels included in the captured image which is the processing object. As a result, bitmap data which includes a match flag showing match or mismatch for each pixel is generated.

After the completion of the matching judgment for all the captured images, the reproduction level calculation unit 109 calculates a reproduction level Ra of one whole image (S608). The reproduction level Ra is obtained by calculating a ratio of the flags showing match as the reproduction level. As to a plurality of pieces of bitmap data corresponding to a plurality of captured images, a ratio of the flags showing match, out of all the bits, is calculated as the reproduction level. Note that a new piece of bitmap data may be created through the logical OR operation performed between the flags on the same pixel positions in the plurality of pieces of bitmap data, and that a ratio of the flags showing match in the new bitmap data may be calculated as the reproduction level.

Moreover, when the reproduction level Ra of the whole image is larger than a first threshold value Th1, the reproduction level calculation unit 109 ends the reproduction level calculation processing without calculating the reproduction levels of the partial areas (S610: Yes). The first threshold value is 80%, for example. This is because the reproduction level Ra of the whole image in this case is favorable and the current projection area for the whole image can be used as the projection surface as it is. The first threshold value may be different depending on purposes. For example, the first threshold value for watching TV may be 75% whereas the first threshold value for watching a movie may be 85%.

Furthermore, when the reproduction level Ra of the whole image is smaller than the first threshold value Th1, the reproduction level calculation unit 109 searches for a partial area in which the reproduction level is larger than a second threshold value Th2 (S612). When such a partial area is found, the reproduction level calculation unit 109 calculates a reproduction level Rb of this partial area (S614 and S616). The second threshold value is a variable which decreases from an initial value, such as 90%, to an end value B in decrements of A. For example, A may be on the order of 10% and B may be on the order of 50%.

Also, when such a partial area is not found or when the reproduction level Rb of the partial area is calculated and the second threshold value Th2 is not below the end value B (S618), the reproduction level calculation unit 109 updates the second threshold value to Th2=Th2−A (S620) and searches for a partial area again.

Accordingly, when the reproduction level of the whole image is unfavorable, a partial area having the favorable reproduction level and a partial area having the unfavorable reproduction level can be searched for.

Here, when the processing method of FIG. 5B is used in place of that of FIG. 5A, a pixel value of the inverse-corrected corrected pattern image may be obtained in S600 instead of obtaining the pixel value Pc of the captured image.

Figure 7:
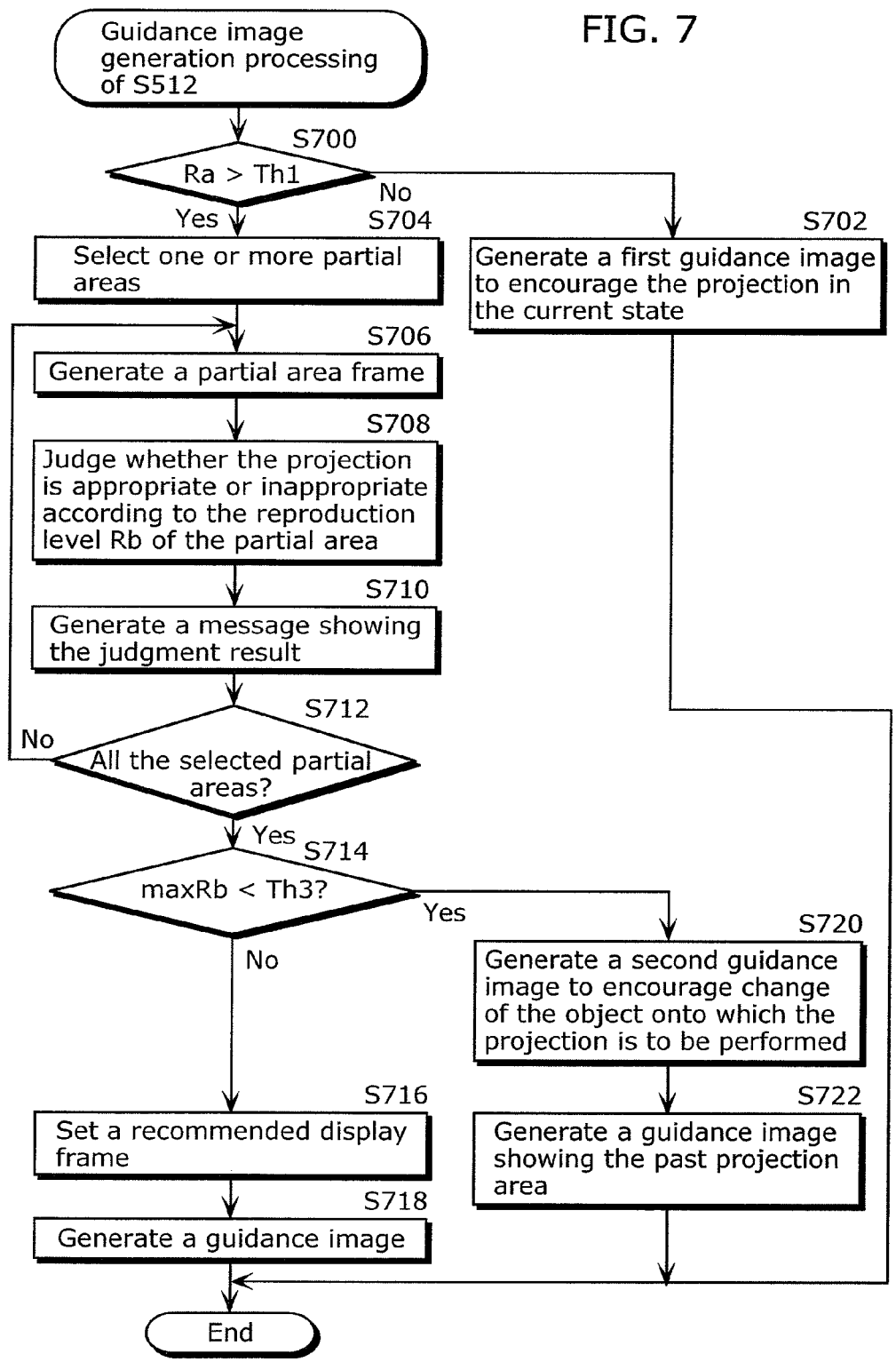
FIG. 7 is a flowchart showing details of guidance image generation processing.

FIG. 7 is a flowchart showing details of the guidance image generation processing of S512 in FIG. 5A and FIG. 5B. As shown in this diagram, when the reproduction level Ra of the whole image is larger than the first threshold value Th1, the guidance image generation unit 111 generates a first guidance image like the guidance image D1 of FIG. 4($a$) that encourages the projection in the current state (S702).

Moreover, when the reproduction level Ra of the whole image is not larger than the first threshold value Th1, the guidance image generation unit 111 selects one or more partial areas, giving a higher priority to the area size and the reproduction level Rb (S704). Here, one or more partial areas to be selected may overlap one another or nested. Alternatively, the number of areas may be fixed, such as five at the maximum.

Furthermore, the guidance image generation unit 111 performs the following processing for each selected partial area.

The guidance image generation unit 111 generates an image showing a frame of the present partial area (S706), judges whether the projection is appropriate or inappropriate according to the reproduction level Rb of the present partial area (S708), and generates a message showing the judgment result (S710). With regard to the judgment as to whether the projection is appropriate or inappropriate, it is judged that the projection is appropriate when the reproduction level Rb is 80% or higher whereas it is judged that the projection is inappropriate when the level is lower than 80%, for example.

When the above processing is completed for all the selected partial areas (S712), the guidance image generation unit 111 judges whether or not a highest reproduction level maxRb out of the levels of the selected partial areas is smaller than a third threshold value (80%, for instance) (S714). When the highest reproduction level maxRb is not smaller than the third threshold, the guidance image generation unit 111 sets a recommended display frame, like the frame D5 of FIG. 4(b), inside the partial area frame having the highest reproduction level maxRb (S716). Then, the guidance image generation unit 111 generates a guidance image including the partial area frame, the projection appropriateness, the message, and the recommended display frame (S718). When the highest reproduction level maxRb is smaller than the third threshold, the guidance image generation unit 111 generates a second guidance image, like the guidance image D6 of FIG. 4(c), which encourages a change of the projection area (S720). In addition, with reference to the internal storage unit, the guidance image generation unit 111 generates a guidance image, like the image D7 of FIG. 4(d), which shows a past projection area (S722).

In this way, the guidance image generation unit 111 judges whether the projection is appropriate or inappropriate for each partial area according to the reproduction level Rb, and generates: a guidance image including a message showing the judgment result for each area and a message regarding the reproduction level for each area; a guidance image encouraging a change of the projection area; a guidance image encouraging the projection in the current state; and a guidance image showing a past projection area. This makes it easy for the user to change to a projection area where the reproduction level is higher.

Next, the correction parameter obtainment processing is explained.

Figure 8:
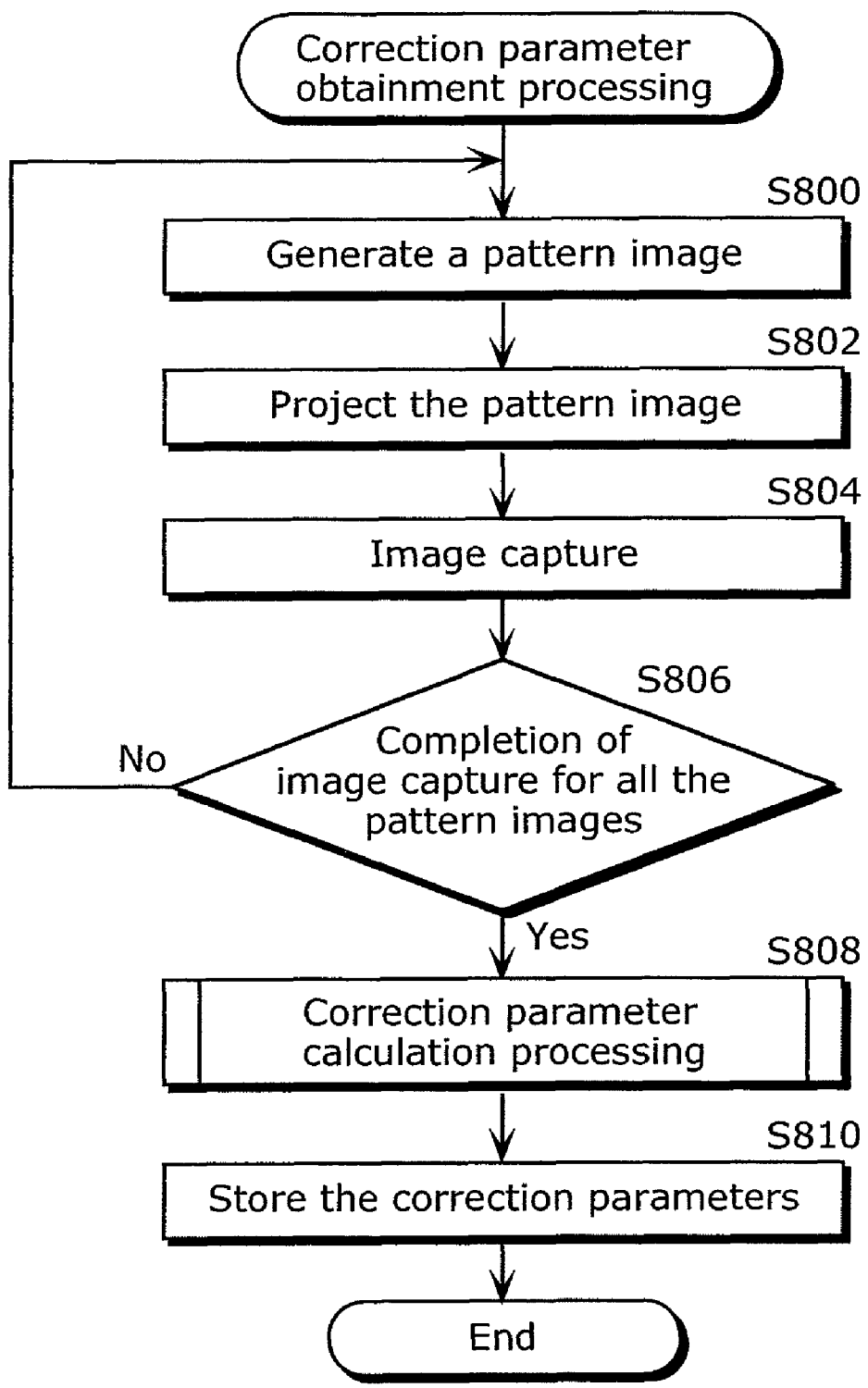
FIG. 8 is a flowchart showing details of correction parameter obtainment processing.
Figure 9:
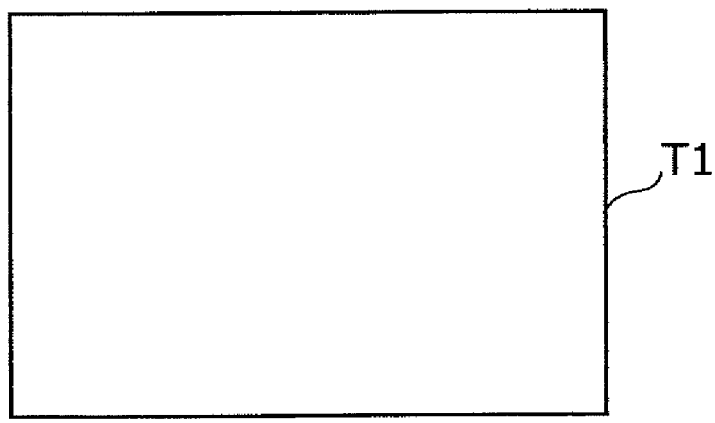
FIGS. 9(a) to (c) are diagrams for explaining examples of test pattern images.
Figure 9:
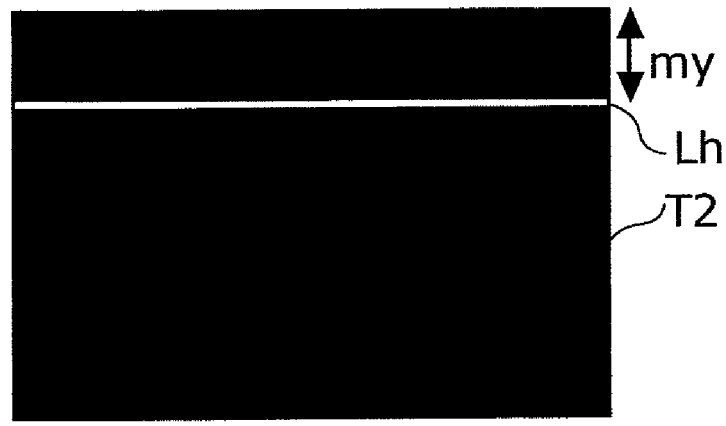
Figure 9:
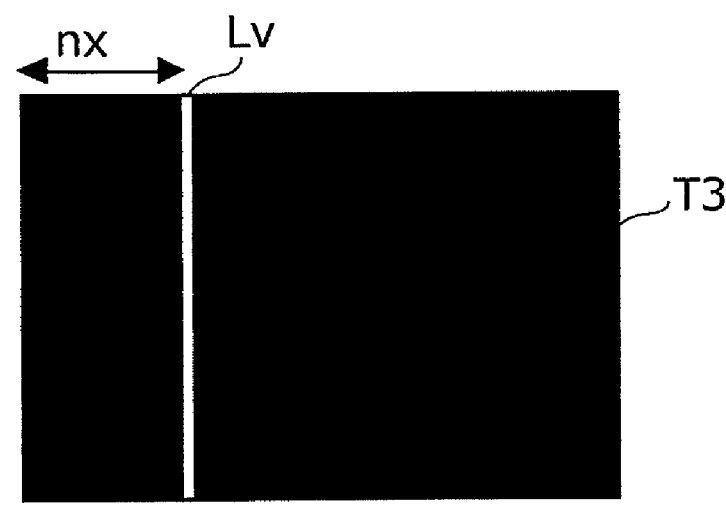

FIG. 8 is a flowchart showing details of the correction parameter obtainment processing performed under the control of the control unit 100. As shown in this diagram, the control unit 100 causes: the pattern image generation unit 104 to generate one pattern image (S800); the projection unit 101 to project the uncorrected pattern image (S802); and the imaging unit to capture the image projected on the projection surface (S804). The captured image is stored in the image memory 103. FIGS. 9(a) to (c) are diagrams for explaining examples of test pattern images generated by the pattern image generation unit 104. An image T1 of FIG. 9(a) is a white pattern image. This image T1 is used for detecting colors and patterns of the projection surface, and deciding on a projection area onto which the corrected image is to be projected when the shape of the projected image is distorted. An image T2 of FIG. 9(b) is a pattern image showing one horizontal straight line Lh. This image T2 is one of a plurality of horizontal straight line images in which the position of the horizontal straight line Lh is changed on a pixel-by-pixel basis or in units of N pixels. An image T3 of FIG. 9(c) is a pattern image showing one vertical straight line Lv. This image T3 is one of a plurality of vertical straight line images in which the position of the vertical straight line Lv is changed on a pixel-by-pixel basis or in units of N pixels. A pair of one horizontal straight line image and one vertical straight line image is used for detecting a correspondence of coordinates between the original image and the projected image.

The control unit 100 repeats S800 to S804 shown in FIG. 8 for all the pattern images (S806). After the completion of the image capture for all the pattern images, the control unit 100 controls the correction parameter calculation processing (S808) and causes the correction parameter storage unit 110 to store the correction parameters (S810).

Figure 10:
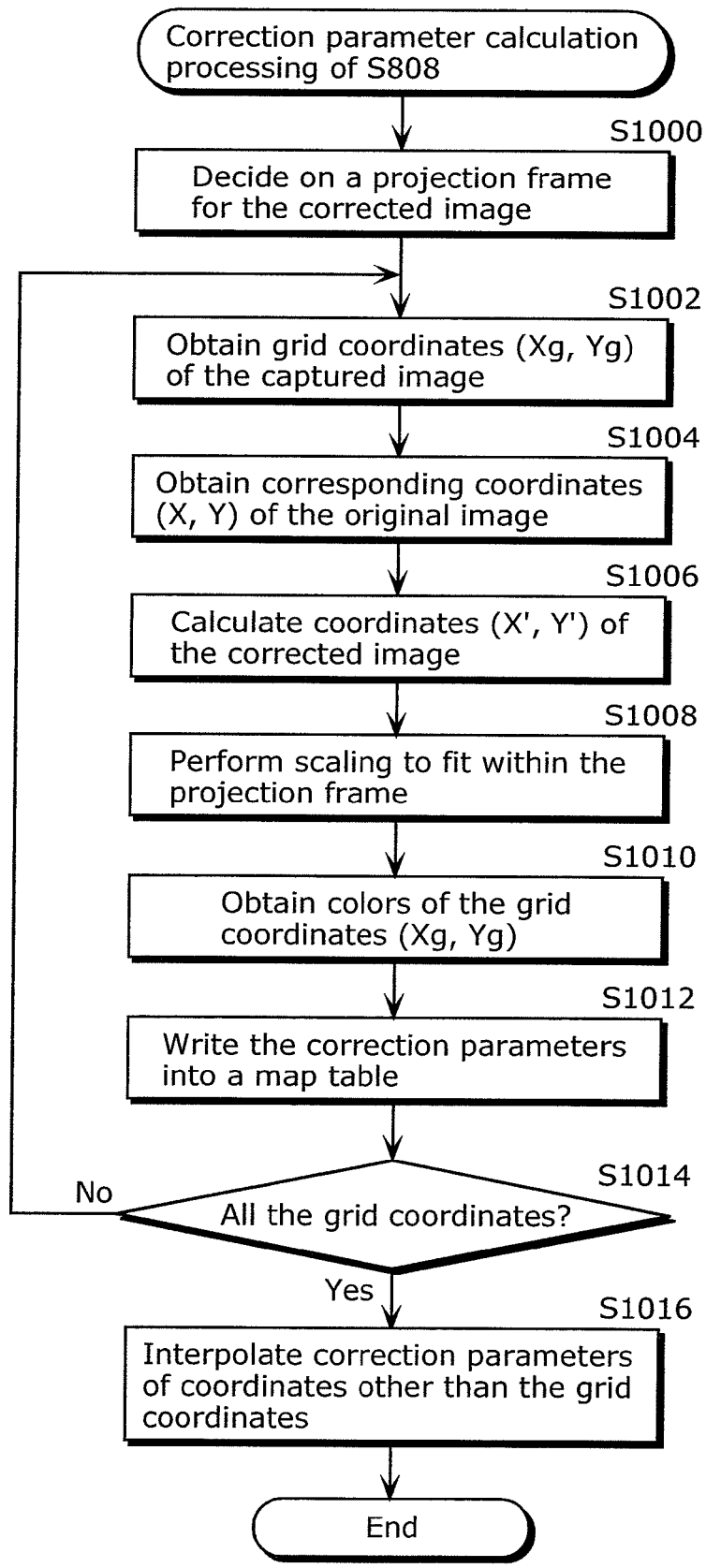
FIG. 10 is a flowchart showing details of correction parameter calculation processing.
Figure 11:
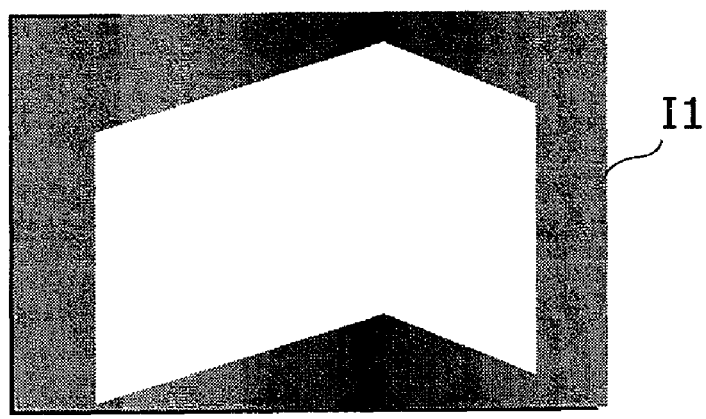
FIGS. 11(a) to (c) are diagrams for explaining a decision on a projection frame.
Figure 11:
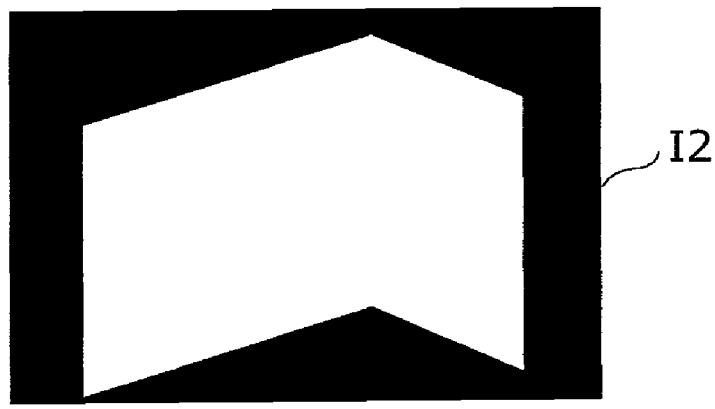
Figure 11:
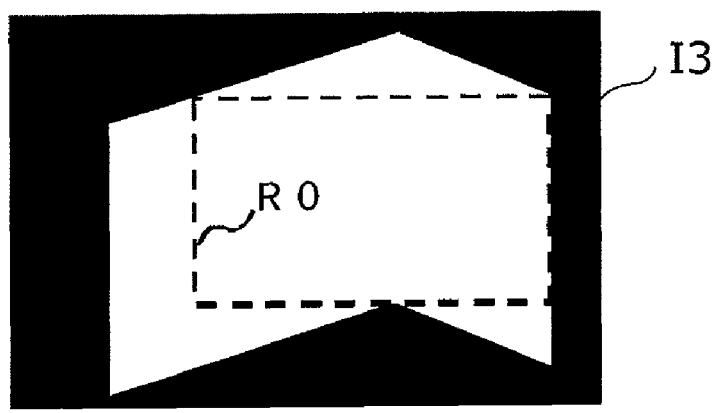

FIG. 10 is a flowchart showing details of the correction parameter calculation processing of S808 in FIG. 8. First, the correction parameter calculation unit 107 decides on a projection frame for the corrected image using the captured image of the white image T1 (S1000). FIGS. 11(a) to (c) are diagrams for explaining a decision on a projection frame. A captured image I1 of FIG. 11(a) is the captured image of the projected white image T1 when the projection surface includes a room corner as in FIG. 2(a). As compared with the original white image T1, the outline of the captured image I1 is largely distorted. By binarizing the captured image I1 of FIG. 11(a), the correction parameter calculation unit 107 obtains an image I2 of FIG. 11(b). Moreover, the correction parameter calculation unit 107 decides on the projection frame which is a largest rectangular area inscribed in the projected image of the binarized image I2 and whose aspect ratio is equal to an aspect ratio of the original image. FIG. 11(c) shows the projection frame that has been decided on.

Figure 12:
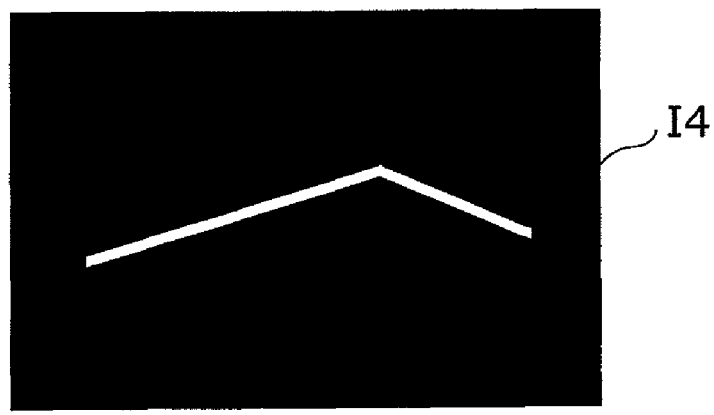
FIGS. 12 (a) to (c) are diagrams showing examples of test pattern images.
Figure 12:
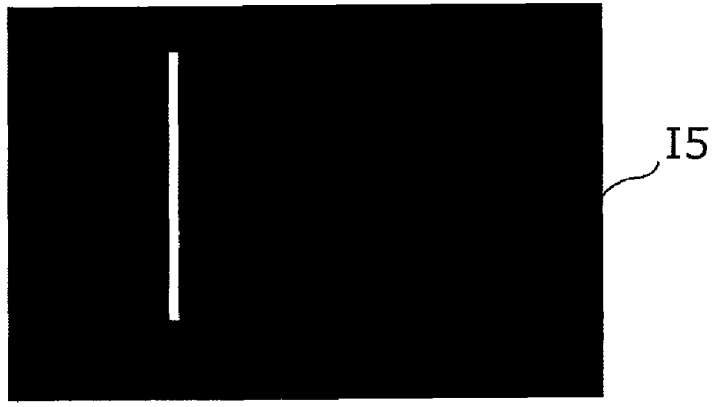
Figure 12:

Moreover, the correction parameter calculation unit 107 performs the following processing for all the pairs of the horizontal straight line image and the vertical straight line image, that is, for all grid coordinates (Xg, Yg) defined as intersection points of the horizontal straight lines and the vertical straight lines. First, the correction parameter calculation unit 107 obtains grid coordinates (Xg, Yg) of the captured image (S1002). FIGS. 12(a) to (c) are diagrams showing examples of the captured test pattern images and the grid coordinates. An image I4 of FIG. 12 (a) shows a capture result of one horizontal straight line image whereas an image I5 of FIG. 12 (b) shows a capture result of one vertical straight line image. This capture result is distorted as in the case of the image T2 of FIG. 3 (b). An image I6 of FIG. 12 (c) shows a result obtained by, for example, binarizing the image I4 and the image I5 and then calculating an AND between the corresponding pixels, that is, the diagram shows an intersection point of the horizontal straight line of the image I4 and the vertical straight line of the image I5. The coordinates of this intersection point are the grid coordinates (Xg, Yg) which correspond to an intersection point (X, Y) of the horizontal straight line image and the vertical straight line image of the original image.

After the obtainment of the grid coordinates, the correction parameter calculation unit 107 obtains the corresponding coordinates (X, Y) of the original image (S1004) and calculates corresponding coordinates (X', Y') of the corrected image using these two sets of coordinates (S1006). To be more specific, the corresponding coordinates (X, Y) of the original image correspond to the coordinates of the image T1 of FIG. 3(a). The grid coordinates (Xg, Yg) of the captured image correspond to the coordinates of the image T2 of FIG. 3 (b). Meanwhile, the coordinates (X', Y') of the unknown corrected image correspond to the coordinates of the image T4 of FIG. 3 (d). When a transform function from the image T1 to the image T2 is f, a relation between the coordinates (X, Y) and the coordinates (Xg, Yg) is expressed as (Equation 1).

$$f(X, Y) = (Xg, Yg) \qquad \text{(Equation 1)}$$

Also, in order to make the image T4 a corrected image, a transform function from the image T4 to image T1 needs to be f. Thus, a relation between the coordinates (X', Y') and the coordinates (X, Y) needs to be expressed as (Equation 2).

$$f(X', Y') = (X, Y) \quad \text{(Equation 2)}$$

From these two Equations, the correction parameter calculation unit 107 calculates the unknown (X', Y') (S1006). In doing so, the correction parameter calculation unit 107 performs scaling so as to make the coordinates (X, Y) not a mesh equal in size to the image T1, but a mesh which fits within the projection frame of the image T3 (S1008). In this way, the values of (X', Y') corresponding to the coordinates (X, Y) are calculated. These (X, Y) and (X', Y') are the shape correction parameters for one set of coordinates.

Furthermore, the correction parameter calculation unit 107 obtains colors (pixel values) of the grid coordinates (Xg, Yg) (S1010) and then writes the obtained value for each of color elements (R, G, B) as the color correction parameter into a map table together with the shape correction parameters (S1012).

After the completion of the correction parameter calculation for all the grid coordinates (S1014), the correction parameter calculation unit 107 calculates correction parameters for coordinates other than the grid coordinates by interpolation using the already calculated correction parameters (S1016) and then writes the parameters into the map table. FIG. 13 is a diagram showing an example of the map table. In the map table of this diagram, the shape correction parameters (x', y') and the color correction parameters (R, G, B) are described for each set of coordinates (X, Y) of the original image.

As described so far, according to the image projection apparatus of the present embodiment, the image projection is controlled on the basis of the reproduction level of the captured image relative to the original image. This makes it easy to use the corrected image closer to the original image. In other words, this can provide use of a projection area having a high reproduction level to the user.

Moreover, the user can obtain the information regarding the reproduction level from the guidance image, thereby using the corrected image closer to the original image. The user can know as to whether the projection is appropriate or inappropriate from the guidance image, thereby reliably using the corrected image closer to the original image. Also, the user can properly judge the appropriateness or inappropriateness of the projection depending on each purpose.

The user can know the appropriateness of the projection not only as to the whole projection area, but also for each partial area. Moreover, the user can know the information regarding the reproduction level for each partial area.

Also, the projection can be carried out only when the reproduction level is larger than a threshold, that is, only when the reproduction level is favorable.

The reproduction level is calculated for the image captured from the projected corrected image. Thus, the reproduction level including both the color reproduction level and the shape reproduction level can be obtained. On account of this, it is effective in the case where the shape of the projection surface is extremely complicated or where the projection surface is a wall corner.

Figure 3:
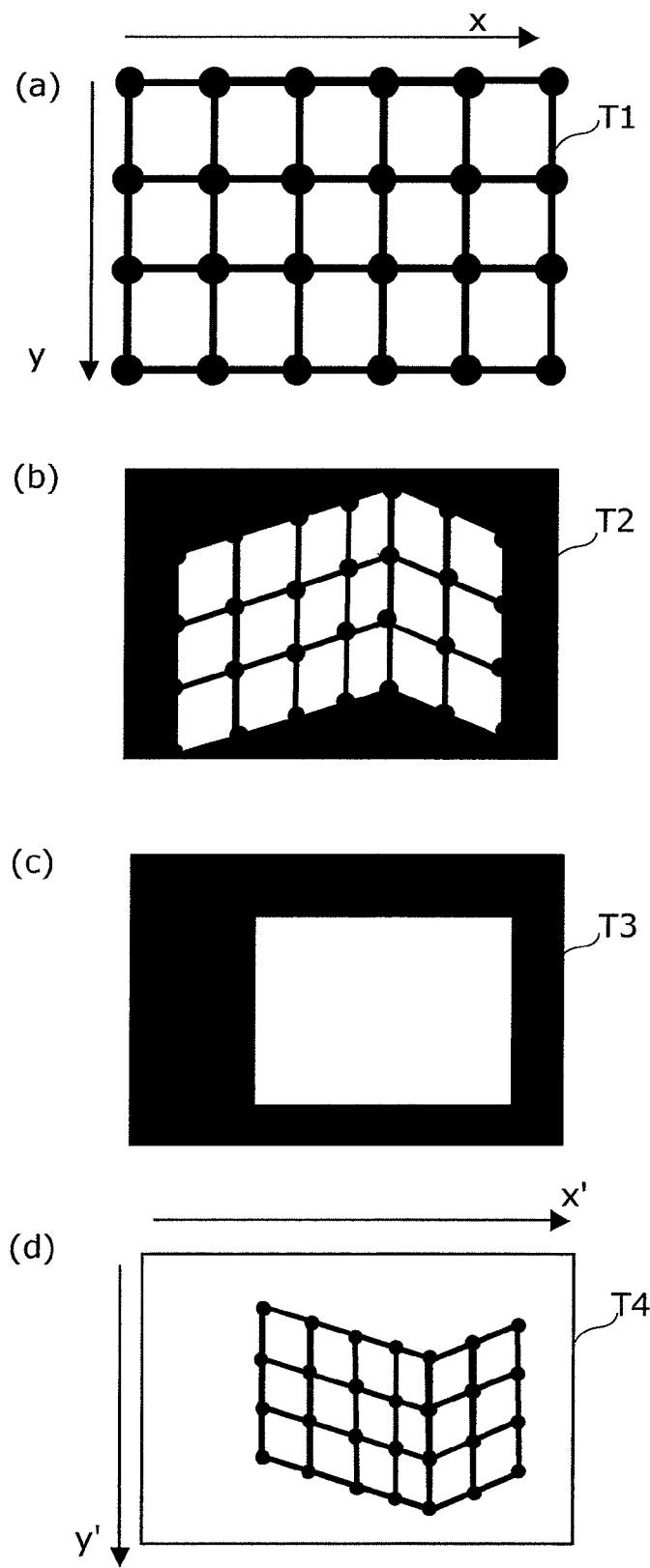
FIGS. 3(a) to (d) are diagrams for explaining correction performed by a correction unit 108.

It should be noted that a grid interval shown in FIG. 3 (*a*) may be one pixel (that is, a whole pixel may be a grid).

Second Embodiment

Figure 14:
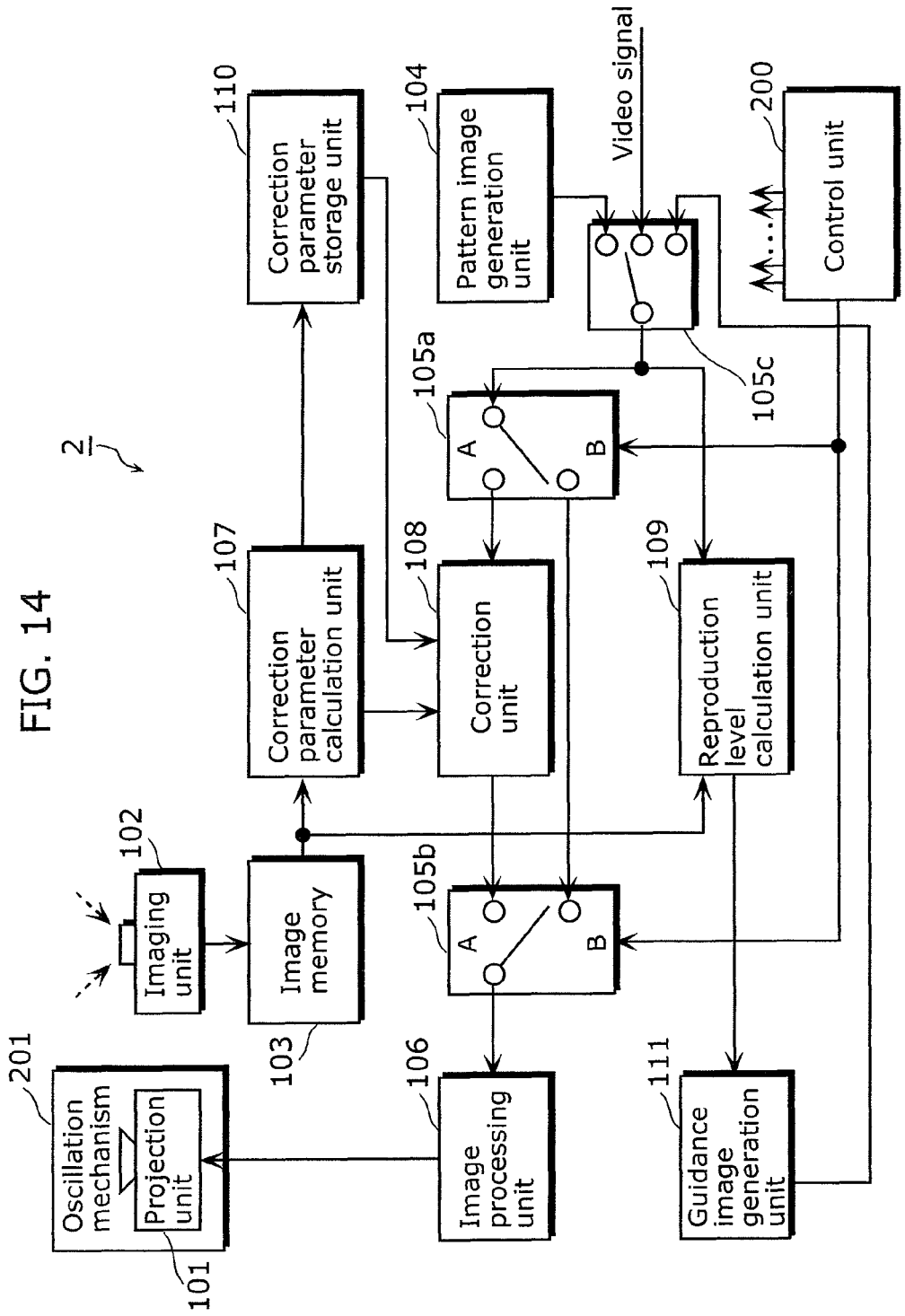
FIG. 14 is a block diagram showing a configuration of an image projection apparatus according to a second embodiment of the present invention.

FIG. 14 is a block diagram showing a configuration of an image projection apparatus according to the second embodiment. As compared to FIG. 1, an image projection apparatus 2 of this diagram is different in that an oscillation mechanism 201 is added and that a control unit 200 is included in place of the control unit 100. Explanations for the same points as FIG. 1 are omitted and different points are mainly explained as follows. It should be noted that an imaging range of the imaging unit 102 is wider as compared to the first embodiment.

The oscillation mechanism 201 is a mechanism which changes a projection direction of the projection unit 101 and includes a horizontal oscillation mechanism for horizontally changing the projection direction of the projection unit 101 and a vertical oscillation mechanism for vertically changing the projection direction of the projection unit 101. Each of the horizontal oscillation mechanism and the vertical oscillation mechanism is driven by a motor and stops at an arbitrary oscillation angle under the control of the control unit 200.

In addition to the functions of the control unit 100 in FIG. 1, the control unit 200: (A) sets a widened area formed by a plurality of projection areas corresponding to a plurality of projection directions; (B) controls reproduction level calculation processing for the widened area; and (C) controls presentation of a guidance image of the widened area. By searching for partial areas in the widened area, a partial area having a favorable reproduction level can be set with a higher degree of reliability.

Figure 15:
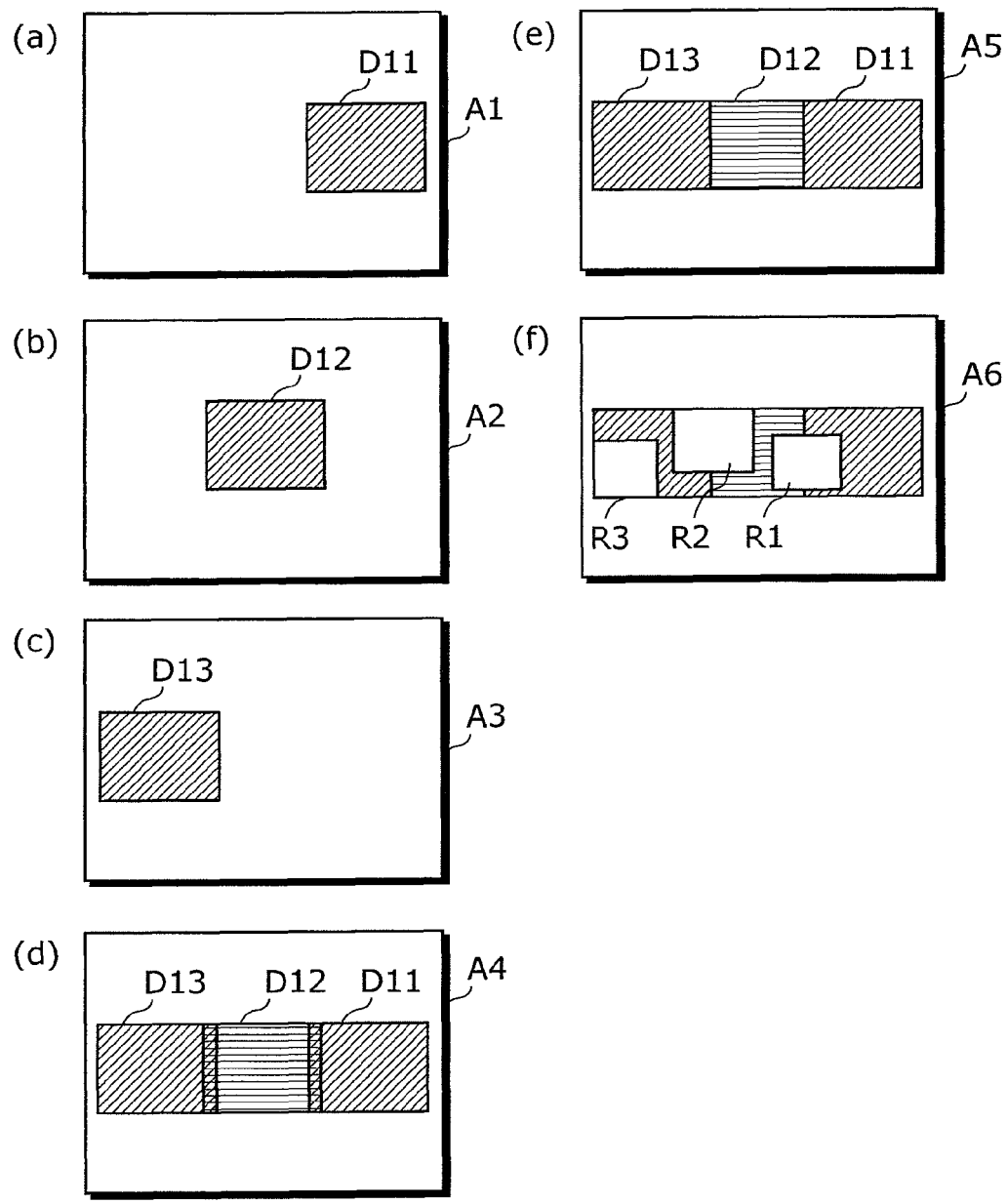
FIGS. 15(a) to (f) are diagrams for explaining a widened area.

FIGS. 15(*a*) to (*f*) are diagrams for explaining the widened area. An image A1 of FIG. 15 (*a*) is an image captured by the imaging unit 102 and a projection area D11 shows a projection area of a case where an oscillation angle of the oscillation mechanism 201 is a first angle (+10 degrees when a horizontal oscillation center is set at 0 degrees, for example). An image A2 of FIG. 15 (*b*) is an image captured by the imaging unit 102 and a projection area D12 shows a projection area of a case where the oscillation angle of the oscillation mechanism 201 is a second angle (0 degrees, for example). An image A3 of FIG. 15 (*c*) is an image captured by the imaging unit 102 and a projection area D13 shows a projection area of a case where the oscillation angle of the oscillation mechanism 201 is a third angle (−10 degrees, for example).

Figure 16:
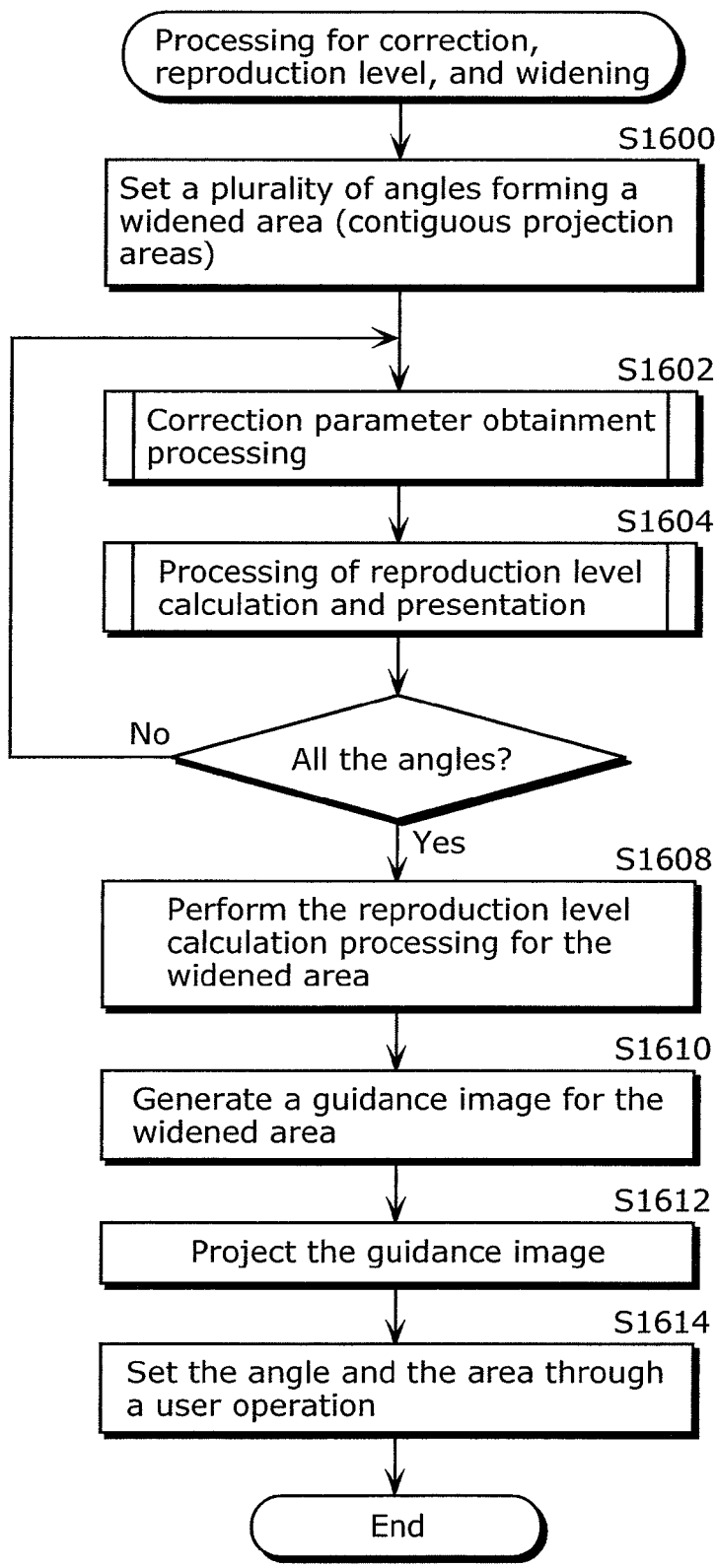
FIG. 16 is a flowchart showing an example of processing for: widened area setting; correction parameter obtainment; and reproduction level obtainment and presentation.

FIG. 16 is a flowchart showing an example of processing for: widened area setting; correction parameter obtainment; and reproduction level obtainment and representation, the processing being performed under the control of the control unit 200. As shown in this diagram, the control unit 200 first judges whether or not a plurality of projection areas (D11, D12, and D13, for example) corresponding to a plurality of projection directions are contiguous, as the above stated (A). When contiguous, the areas are treated as a widened area as shown in FIG. 15(*d*). Thus, the first to third angles are stored, and a setting value for each of these angles is stored for the oscillation mechanism 201 to be set to. In this way, the contiguous areas are set as a widened area. Note that the projected image in this case may be a white image pattern, for example.

Moreover, the control unit 200 controls the correction parameter obtainment processing for each of the plurality of projection areas (S1602), and controls the processing of the reproduction level calculation and representation (S1604). Here, Step S1602 may be the same as shown in FIG. 8. Step S1604 may be the same as S500 to S510 shown in FIG. 5A. After the completion of the processing for all the angles corresponding to the plurality of projection areas, the control unit 200 performs the reproduction level calculation processing for the widened area (S1608). In this reproduction level calculation processing, one piece of bitmap data is created corresponding to the widened area as shown in FIG. 15(*e*) from the matching judgment flag for each pixel calculated for each projection area, and then partial areas are searched for in the widened area. This Step S1608 may be the same as S610 to S620 in FIG. 6.

In the reproduction level calculation processing in the above stated S1608, the control unit 200 searches for a partial area in which the reproduction level is favorable in the widened area. As a result, although partial areas R1 and R2 out of partial areas R1, R2, and R3 in FIG. 15(f) are both spreading across a boundary between the projection areas and thus cannot be searched for in a single projection area, it becomes possible for these areas to be easily searched for by setting the widened area.

Furthermore, the control unit 200 controls guidance image generation processing performed for the widened area (S1610), causes the guidance image to be projected (S1612), and sets the angle of the oscillation mechanism 201 and the projection area to have the projection direction face the partial areas selected through a user operation (S1614). Accordingly, the projection is started on the partial areas selected by the user.

As described so far, according to the image projection apparatus 2 of the present embodiment, the reproduction level can be obtained relative to the widened area larger than the projection area. Therefore, a partial area in which the reproduction level is high can be searched for with a higher degree of reliability. Moreover, this can encourage the user to select a projection area having the highest reproduction level.

It should be noted that, when the widened area is set in the second embodiment, the control unit 200 may set an angle for the projection area including contiguous areas while causing the oscillation mechanism 201 to oscillate.

Also, the oscillation mechanism 201 may be configured by a pair of mirrors one of which turns vertically and the other turns horizontally, so that a reflection direction of a projection light can be changed vertically and horizontally.

Moreover, instead of the oscillation mechanism 201, a rotation mechanism may be included for rotating the entire image projection apparatus 2.

Furthermore, when the image projection apparatus 2 includes a display unit, such as an LCD, the above mentioned guidance images may be displayed on the display unit. For example, when a projector manufactured by downsizing the image projection apparatus of the above described first or second embodiment is included on a mobile terminal apparatus (such as a cellular mobile phone, a PDA, or a notebook-sized personal computer), the above mentioned guidance images may be displayed by at least one of the display unit and the projection.

It should be noted that the imaging unit 102 may capture monochrome images, not color images. In this case, the projection unit 101 may project three test patterns respectively for red, green, and blue, and the imaging unit 102 then may superimpose three monochrome images corresponding to red, green, and blue to have a three-color-component image.

Additionally, all the functional blocks shown in the block diagrams of FIG. 1 and FIG. 14 are realized as an LSI which is typically an integrated circuit device. This LSI may be integrated into a single chip or into a plurality of chips. For example, the functional blocks except for the memory, such as the image memory 103, may be integrated into one chip. Although referred to as the LSI here, it may be referred to as an IC, a system LSI, a super LSI, or an ultra LSI depending on the scale of integration.

A method for circuit integration is not limited to application of an LSI. It may be realized using a dedicated circuit or a general purpose processor. After an LSI is manufactured, an FPGA (Field Programmable Gate Array) which is programmable or a reconfigurable processor for which the connections and settings of circuit cells inside the LSI are reconfigurable may be used.

Moreover, when a circuit integration technology that replaces LSIs comes along owing to advances of the semiconductor technology or to a separate derivative technology, the functional blocks should be understandably integrated using that technology. There can be a possibility of adaptation of biotechnology, for example.

Furthermore, among all the functional blocks, only the unit for storing the data may not be integrated into the single chip and separately configured.

Also, it should be noted that the central part including the control units 100 or 200 among all the functional blocks shown in the block diagrams of FIG. 1 and FIG. 14 and each flowchart shown in FIG. 5A to FIG. 8, FIG. 10, and FIG. 16 are realized by a processor and its programs. For this reason, the present invention may be configured as a program.

INDUSTRIAL APPLICABILITY

The present invention is suitable for an image projection apparatus which projects an image onto a screen.

The invention claimed is:

1. An image projection apparatus which projects a corrected image according to a projection surface, comprising:
an imaging unit configured to capture a projected image;
a first calculation unit configured to calculate a correction parameter, on the basis of the captured image, for correcting an image distortion caused by the projection surface;
a correction unit configured to generate a corrected image by correcting the image using the correction parameter;
a second calculation unit configured to calculate a reproduction level of one of i) the corrected image generated by said correction unit and ii) an image obtained by projection and image capture of the corrected image, relative to an original image; and
a control unit configured to control image projection according to the reproduction level.

2. The image projection apparatus according to claim 1, further comprising
an image generation unit configured to generate a guidance image regarding the reproduction level,
wherein said control unit is configured to control projection of the guidance image.

3. The image projection apparatus according to claim 2, wherein said image generation unit is configured to judge, according to the reproduction level, whether or not the projection onto a projection surface is appropriate, and to generate the guidance image showing a result of the judgment.

4. The image projection apparatus according to claim 3, wherein said image generation unit is configured to select a threshold value depending on a purpose when making the appropriateness judgment, and to use the selected threshold value.

5. The image projection apparatus according to claim 2, wherein said second calculation unit is configured to calculate the reproduction level for each of a plurality of partial areas included in a projection area of the projection surface, and
said image generation unit is configured to judge, for each of the partial areas, whether or not the projection is appropriate according to the reproduction level, and to generate the guidance image showing a result of the judgment for each of the partial areas.

6. The image projection apparatus according to claim 2, wherein said second calculation unit is configured to calculate the reproduction level for each of a plurality of partial areas included in a projection area of the projection surface, and
said image generation unit is configured to generate the guidance image regarding the reproduction level for each of the partial areas.

7. The image projection apparatus according to claim 1, wherein said second calculation unit is configured to calculate the reproduction level by comparing corresponding pixels between the corrected image and the original image.

8. The image projection apparatus according to claim 7, wherein said control unit is configured to cause said imaging unit to capture the corrected image projected on the projection surface, and
said second calculation unit is configured to calculate the reproduction level by comparing corresponding pixels between: the image obtained by said imaging unit capturing the corrected image; and the original image.

9. The image projection apparatus according to claim 7, wherein said first calculation unit is further configured to calculate an inverse correction parameter representing an inverse transformation of the correction performed using the correction parameter,
said correction unit is further configured to perform the inverse transformation on the corrected image, using the inverse correction parameter, and
said second calculation unit is further configured to calculate the reproduction level by comparing corresponding pixels between the inverse-transformed corrected image and the original image.

10. The image projection apparatus according to claim 7, further comprising
an image generation unit configured to generate a guidance image regarding the reproduction level,
wherein said control unit is configured to control projection of the guidance image.

11. The image projection apparatus according to claim 10, wherein said image generation unit is configured to judge, according to the reproduction level, whether or not the projection onto a projection surface is appropriate, and to generate the guidance image showing a result of the judgment.

12. The image projection apparatus according to claim 11, wherein said image generation unit is configured to select a threshold value depending on a purpose when making the appropriateness judgment, and to use the selected threshold value.

13. The image projection apparatus according to claim 10, wherein said second calculation unit is configured to calculate the reproduction level for each of a plurality of partial areas included in a projection area of the projection surface, and
said image generation unit is configured to judge, for each of the partial areas, whether or not the projection is appropriate according to the reproduction level, and to generate the guidance image showing a result of the judgment for each of the partial areas.

14. The image projection apparatus according to claim 10, wherein said second calculation unit is configured to calculate the reproduction level for each of a plurality of partial areas included in a projection area of the projection surface, and
said image generation unit is configured to generate the guidance image regarding the reproduction level for each of the partial areas.

15. The image projection apparatus according to claim 1, further comprising
a changing unit configured to change a projection direction,
wherein said control unit is configured to decide on a plurality of projection directions for obtaining a widened area,
the widened area includes a plurality of projection areas corresponding to the plurality of projection directions, and
said second calculation unit is configured to calculate the reproduction level for each of the plurality of projection areas, and to calculate the reproduction level of the widened area according to the reproduction level for each of the plurality of projection areas.

16. The image projection apparatus according to claim 15, wherein said second calculation unit is configured to calculate the reproduction level for each of a plurality of partial areas included in the widened area, and
said image generation unit is configured to judge, for each of the partial areas, whether or not the projection is appropriate according to the reproduction level, and to generate the guidance image showing a result of the judgment for each of the partial areas.

17. The image projection apparatus according to claim 16, wherein said control unit is further configured to select a partial area on the basis of a user operation, and to cause the image to be projected onto the selected partial area.

18. The image projection apparatus according to claim 15, wherein said second calculation unit is configured to calculate the reproduction level for each of a plurality of partial areas included in the widened area, and
said image generation unit is configured to generate the guidance image regarding the reproduction level for each of the partial areas.

19. A control method for controlling an image projection apparatus which projects an image, said control method comprising:
capturing a projected image;
calculating, on the basis of the captured image, a correction parameter for correcting an image distortion caused by a projection surface;
generating a corrected image by correcting the image using the correction parameter;
calculating a reproduction level of one of i) the corrected image generated in said generating and ii) an image obtained by projection and image capture of the corrected image, relative to an original image; and
controlling image projection on the basis of the reproduction level.

20. A semiconductor device for controlling an image projection apparatus which projects an image, said semiconductor device comprising:
an imaging unit configured to capture a projected image;
a first calculation unit configured to calculate a correction parameter, on the basis of the captured image, for correcting an image distortion caused by the projection surface;
a correction unit configured to generate a corrected image by correcting the image using the correction parameter;
a second calculation unit configured to calculate a reproduction level of one of i) the corrected image generated by said correction unit and ii) an image obtained by projection and image capture of the corrected image, relative to an original image; and a control unit configured to control image projection on the basis of the reproduction level.

21. A non-transitory computer readable recording medium having stored thereon a program which is readable by a computer included in an image projection apparatus for projecting an image, wherein, when executed, said program causes the computer to perform a method comprising:

capturing a projected image;

calculating, on the basis of the captured image, a correction parameter for correcting an image distortion caused by a projection surface;

generating a corrected image by correcting the image using the correction parameter;

calculating a reproduction level of one of i) the corrected image generated in said generating and ii) an image obtained by projection and image capture of the corrected image, relative to an original image; and controlling image projection on the basis of the reproduction level.

* * * * *